(12) United States Patent
Rodriguez et al.

(10) Patent No.: US 7,006,625 B2
(45) Date of Patent: Feb. 28, 2006

(54) CORDLESS TELEPHONE-TO-SOUND CARD INTERFACE ADAPTER WITH HYBRID TRANSFORMER AND CONTROL CIRCUIT

(75) Inventors: Luis Ricardo Rodriguez, Wheaton, IL (US); Hanz Werner Herrig, Aurora, IL (US)

(73) Assignee: NVG, Inc., Oakbrook, IL (US)

( * ) Notice: Subject to any disclaimer, the term of this patent is extended or adjusted under 35 U.S.C. 154(b) by 32 days.

(21) Appl. No.: 10/848,434

(22) Filed: May 18, 2004

(65) Prior Publication Data

US 2005/0003858 A1    Jan. 6, 2005

Related U.S. Application Data

(63) Continuation-in-part of application No. 10/743,644, filed on Dec. 22, 2003.

(30) Foreign Application Priority Data

Jul. 2, 2003    (MX) .................. PA/A/2003/005992

(51) Int. Cl.
*H04M 9/00*    (2006.01)
(52) U.S. Cl. ...................... 379/403; 379/402; 379/404; 379/413.02; 379/413.03; 379/413.04
(58) Field of Classification Search .... 379/394–413.04
See application file for complete search history.

(56) References Cited

U.S. PATENT DOCUMENTS

| | | | | |
|---|---|---|---|---|
| 4,507,524 | A | * | 3/1985 | Yun ....................... 379/388.06 |
| 5,455,859 | A | * | 10/1995 | Gutzmer ..................... 379/442 |
| 6,047,060 | A | * | 4/2000 | Fedorov et al. ........ 379/265.02 |
| 6,108,704 | A | | 8/2000 | Hutton et al. |
| 6,138,036 | A | | 10/2000 | O'Cinneide |
| 6,169,734 | B1 | | 1/2001 | Wilson |
| 6,236,868 | B1 | * | 5/2001 | Lygas ...................... 455/569.2 |
| 6,243,373 | B1 | | 6/2001 | Turock |
| 6,424,647 | B1 | | 7/2002 | Ng et al. |
| 6,424,648 | B1 | | 7/2002 | Ng et al. |
| 6,442,169 | B1 | | 8/2002 | Lewis |

(Continued)

OTHER PUBLICATIONS

Bigelow, Stephen,(Editor), "Understanding Telephone Electronics" (BOOK), 1997, Pub. Butterworth-Heinemann, pp. 68-72.*

(Continued)

*Primary Examiner*—Sinh Tran
*Assistant Examiner*—Ramnandan Singh
(74) *Attorney, Agent, or Firm*—John J. Oskorep, Esq.

(57) ABSTRACT

A cordless telephone-to-sound card interface adapter provides a connection between any standard cordless telephone system and a sound card of a computer for PC-to-PC or PC-to-telephone voice communications over the Internet. The interface adapter includes a hybrid transformer circuit for interfacing a two-wire circuit of the cordless telephone and a four-wire circuit of the computer sound card. Consisting of passive components, this hybrid transformer circuit cancels out the voice echo that would otherwise exist due to mismatched impedances between the two media and/or from leakage of the signal being transmitted and received on the same pair of telephone lines. Preferably, a Universal Serial Bus (USB) interface is provided to supply a bias voltage to the cordless telephone system through the interface adapter. The interface adapter may also include interfaces for connecting with external computer speakers and microphone, and a control circuit for automatically switchably coupling the computer sound card to either the cordless telephone or the external speakers and microphone as appropriate.

13 Claims, 8 Drawing Sheets

U.S. PATENT DOCUMENTS

| | | |
|---|---|---|
| 6,453,027 B1 | 9/2002 | Kang et al. |
| 6,731,751 B1 * | 5/2004 | Papadopoulos ........ 379/399.01 |
| 2001/0001610 A1 * | 5/2001 | McElvaney .................. 370/463 |
| 2001/0012285 A1 * | 8/2001 | Shaharabani et al. ....... 370/352 |
| 2001/0028642 A1 | 10/2001 | Veschi |
| 2001/0040960 A1 * | 11/2001 | Hamami et al. ............ 379/352 |
| 2002/0164003 A1 | 11/2002 | Chiang et al. |
| 2003/0032393 A1 | 2/2003 | Kennedy et al. |

OTHER PUBLICATIONS

U.S. Appl. No. 10/743,644; Rodriguez; Entitled "Cordless Telephone -To-Sound Card Interface Adapter Having a Hybrid Transformer Circuit", file date Dec. 22, 2003.

* cited by examiner

CORDLESS TELEPHONE-TO-SOUND CARD INTERFACE ADAPTER WITH HYBRID TRANSFORMER AND CONTROL CIRCUIT

CROSS-REFERENCE TO RELATED APPLICATIONS

This application is a continuation-in-part of U.S. patent application Ser. No. 10/743,644 entitled "Cordless Telephone-To-Sound Card Interface Adapter Having A Hybrid Transformer Circuit" filed on Dec. 22, 2003, and claims earlier priority to Mexican patent application entitled "Device Allowing Connection of Wireless Telephone to Computer for Internet Telephony" having Serial No. PA/a/2003/005992 and filing date of Jul. $2^{nd}$ 2003.

BACKGROUND

1. Field of the Invention

The present invention relates to a cordless telephone-to-sound card interface adapter with a hybrid transformer, which provides mobility to an end user during voice communications over the Internet.

2. Description of the Related Art

Historically, a determining factor in the low usage of Internet telephony usage was attributed to poor voice quality. Nevertheless, in the last few years major progress has been made in this area to address the voice quality issues. These improvements have motivated Internet users, especially people or companies with limited budgets for international long-distance calls, to take advantage of the service. The service advantageously provides savings of up to 70% over the traditional calling system, in addition to the relatively low rates offered by Internet providers and traditional local-call telephony.

The present application concerns an interface adapter which connects between a cordless telephone system and a computer for facilitating voice communications over the Internet using Voice over IP (VoIP) communications. There are at least two such interface adapter devices on the U.S. market—namely, the Phonebridge device and the ChatBridge device. The ChatBridge device utilizes a Universal Serial Bus (USB) interface, a digital signal processor (DSP), and sophisticated software to emulate an application on the computer for canceling echo so that a sound card is not needed for voice communication. With the Phonebridge device, the computer must be equipped with a sound card to establish voice communication but sophisticated electronics are also required for its operation.

A computer may often use external speakers and microphone which interface with the sound card. Without any special mechanism in the interface adapter, however, the end user would undesirably have to disconnect and reconnect the external computer speakers and microphone from the sound card each time an Internet call is made using the interface adapter and cordless telephone.

Thus, what is needed is a low-cost but effective interface adapter which connects between a cordless telephone and a computer for facilitating voice communications over the Internet using VoIP communications that is convenient to use.

SUMMARY

What has been developed is a cordless telephone-to-sound card interface adapter that will allow Internet users to establish PC-to-telephone and PC-to-PC voice conversations over the Internet by means of instant messaging using their PC and any standard cordless telephone, freeing them from sitting idly in front of their PC and offering mobility while they talk anywhere in their homes or offices. The interface adapter includes a hybrid transformer circuit for matching the impedance between a PC sound card (600Ω impedance of the speaker line and 10 KΩ impedance of the microphone line) and the cordless telephone system (450Ω nominal impedance), thereby canceling out voice echo during telephone conversations over the Internet. Preferably, the hybrid transformer circuit consists of passive components.

The interface adapter may also include interfaces for connecting with external computer speakers and microphone, as well as a control circuit for automatically switching between a standard computer audio mode and cordless telephone mode. The standard computer audio mode involves a connection between the computer sound card and the external speakers and microphone, while the cordless telephone mode involves a connection between the computer sound card and the cordless telephone.

In a preferred embodiment, a cordless telephone-to-sound card interface adapter includes a housing unit and a hybrid transformer circuit carried in the housing unit which includes a first hybrid transformer, a second hybrid transformer coupled to the first hybrid transformer, and an impedance matching circuit coupled to the first and the second hybrid transformers. Preferably, the impedance matching circuit consists of a resistor. The first hybrid transformer includes a coil A which is inductively coupled with coils B and C formed along the same core. The second hybrid transformer including a coil F which is inductively coupled with coils D and E formed along the same core. A speaker plug is coupled to the first hybrid transformer and is configured for coupling to a speaker jack of a computer sound card. A microphone plug is coupled to the second hybrid transformer and is configured for coupling to a microphone jack of the computer sound card. A telephone jack is coupled to the first and the second hybrid transformers and is configured to connect to a cordless telephone system with a telephone cord. Preferably, a Universal Serial Bus (USB) interface is provided as well for supplying a bias voltage to the cordless telephone system through the interface adapter.

The interface adapter may also include a speaker jack being configured to connect with an external speaker and a microphone jack being configured to connect with an external microphone. A control circuit coupled to the hybrid transformer circuit includes a transistor switch; a comparator having a first input coupled to the telephone jack, a second input coupled to a reference voltage, and an output coupled to an input of the transistor switch; a first relay for switchably coupling the speaker plug between the speaker jack and the first hybrid transformer responsive to an output of the transistor switch; and a second relay for switchably coupling the microphone plug between the microphone jack and the second hybrid transformer responsive to the output of the transistor switch.

Advantageously, the interface adapter provides a convenient low-cost yet effective means to provide mobility for an end user during voice communications over the Internet.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

As described herein, a cordless telephone-to-sound card interface adapter of the present application is configured to operate with any PC equipped with a sound card and any standard telephone, which is preferably a cordless telephone system to provide the user with mobility. In one specific implementation, the interface adapter includes a hybrid transformer circuit having two hybrid transformers with multiple 600Ω coils and an impedance matching circuit having a precision resistor and an optional capacitor. The primary function of the hybrid transformer circuit, which operates through electromagnetic coupling like other transformers, is to effect the conversion from two wires (the cordless telephone) to four wires (the computer sound card) with suitable impedance matching, thereby separating the transmitted voice from the received voice without producing voice echo toward the origin. The interface adapter includes a speaker plug for a receive signal (Rx) and a microphone plug for a transmit signal (Tx) which are connected to the computer's sound card. A telephone interface of the interface adapter is connected to the cordless telephone system to facilitate voice conversation over the Internet with end-user mobility. Preferably, a Universal Serial Bus (USB) interface is provided to supply a bias voltage to the cordless telephone system through the interface adapter. The interface adapter may also include interfaces for connecting with external computer speakers and microphone as well as a control circuit for automatically switchably coupling the computer sound card to either the cordless telephone or the external speakers and microphone as appropriate. Advantageously, the interface adapter of the present application is a simple and convenient low-cost means for providing mobility to an end user for voice communications over the Internet.

Figure 1:
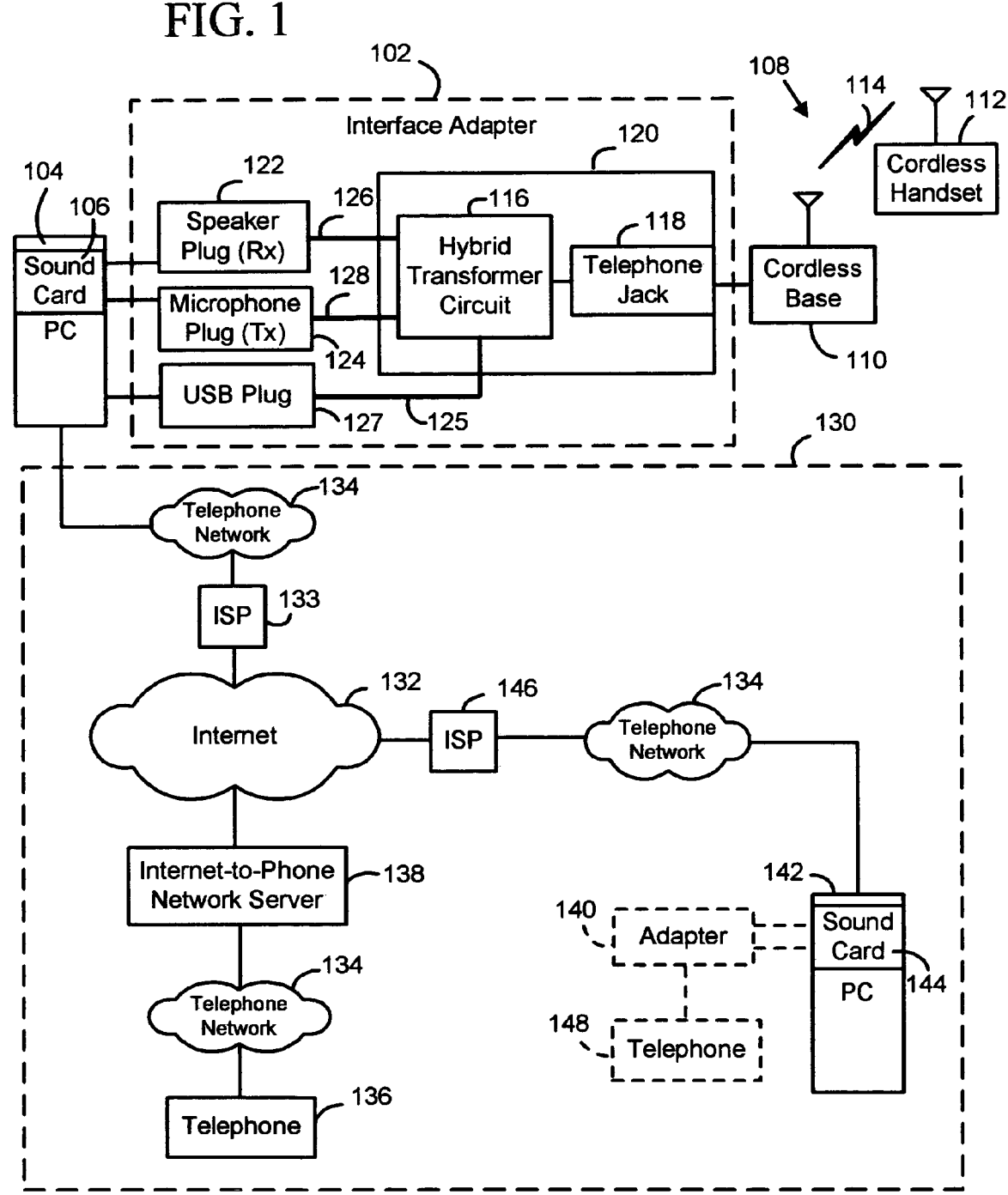
FIG. 1 is a block diagram illustration of a voice communication system which utilizes a cordless telephone-to-sound card interface adapter of the present application.

FIG. 1 is an illustration of a voice communication system 100 which utilizes a cordless telephone-to-sound card interface adapter 102 of the present application. In general, interface adapter 102 helps facilitate voice communications between a first end user of a cordless telephone system 108 and a second end user of a telephone 136/148 or a computer 142 using instant messaging communications over the Internet.

Figure 2:
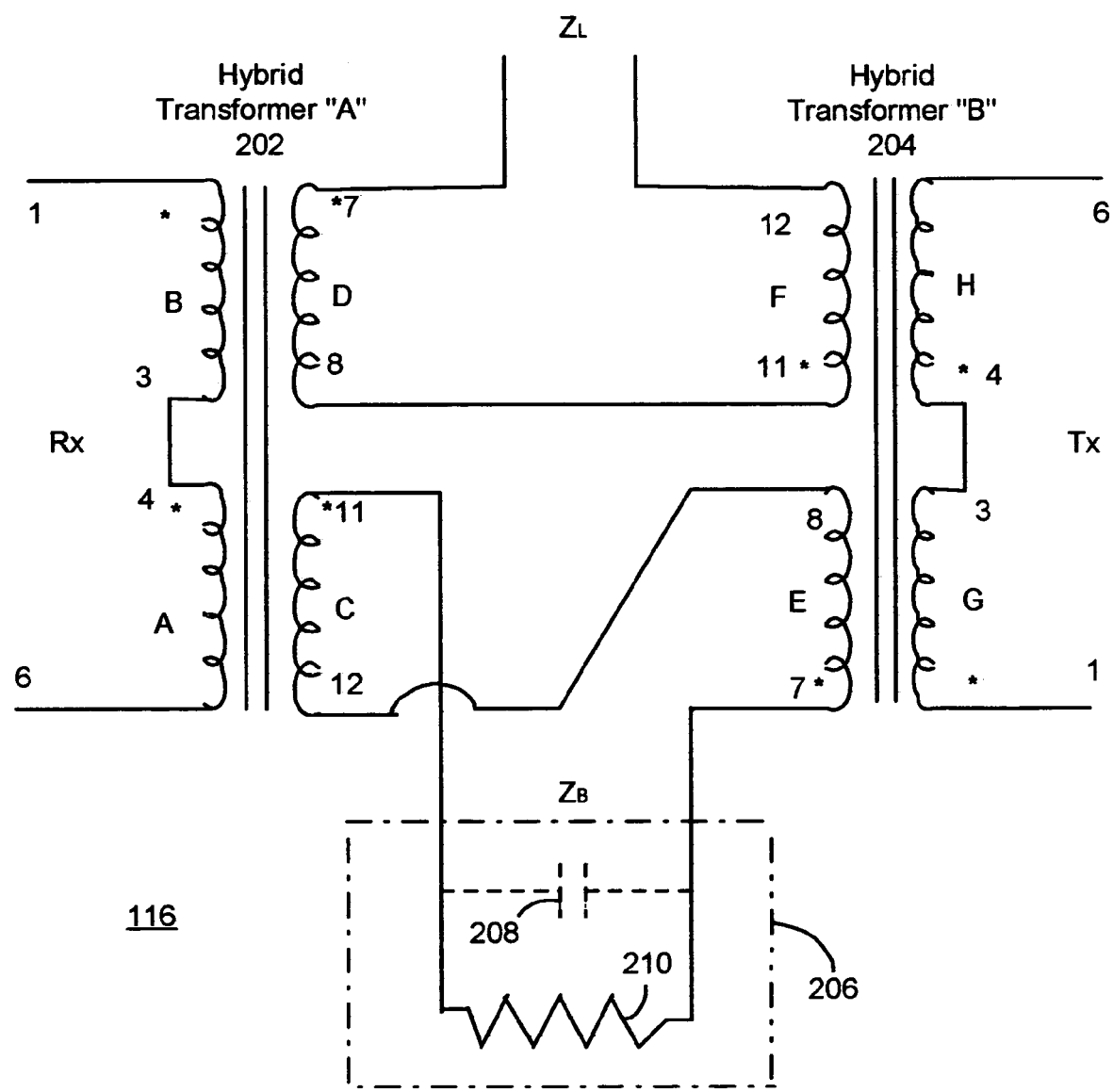
FIG. 2 is a schematic diagram of a hybrid transformer circuit of the interface adapter of FIG. 1 in a first embodiment.
Figure 3:
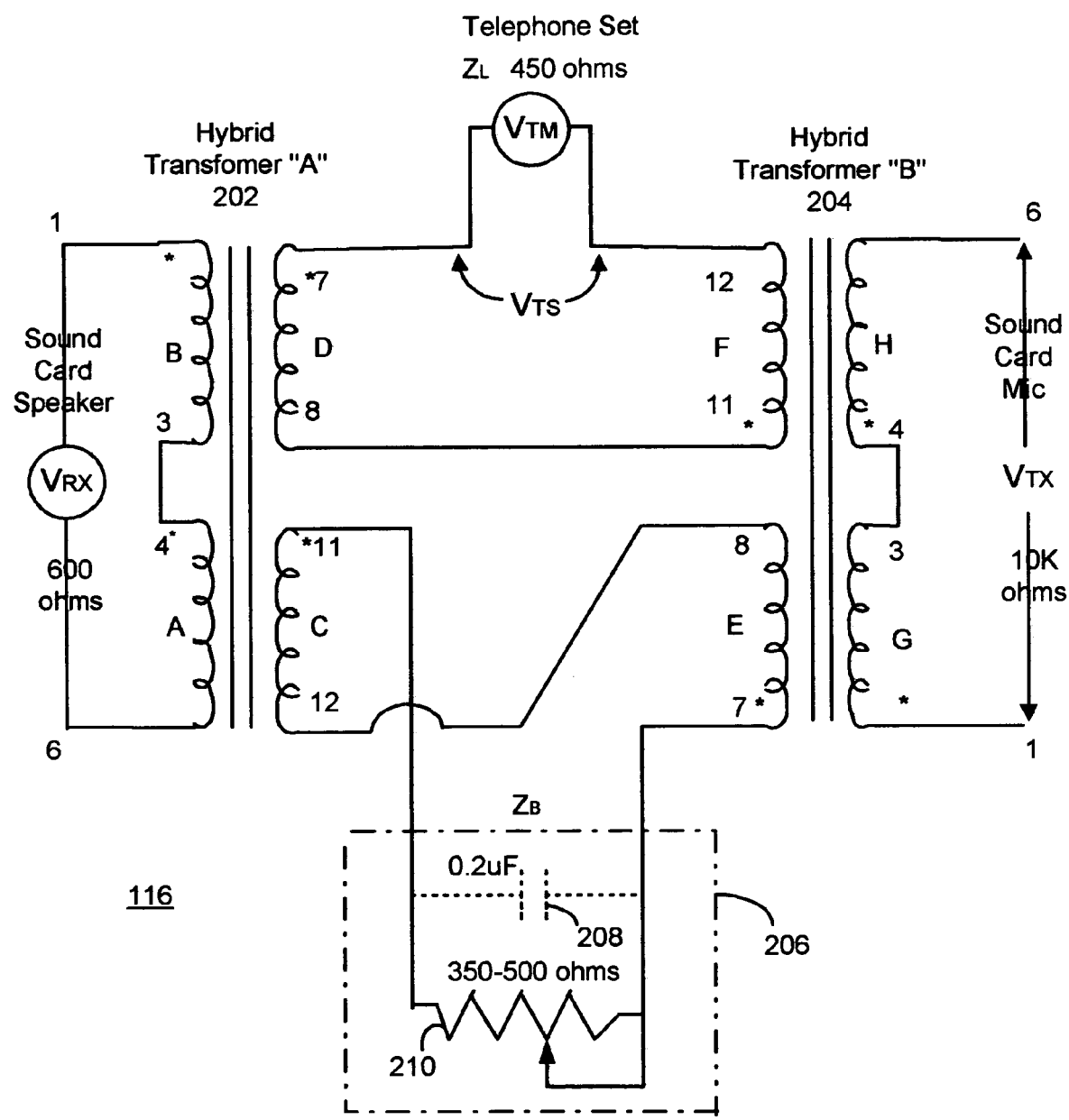
FIG. 3 is a schematic diagram of the hybrid transformer circuit of FIG. 2, showing relevant equivalent circuit information when coupled to a cordless telephone system and a sound card of a computer.
Figure 4:
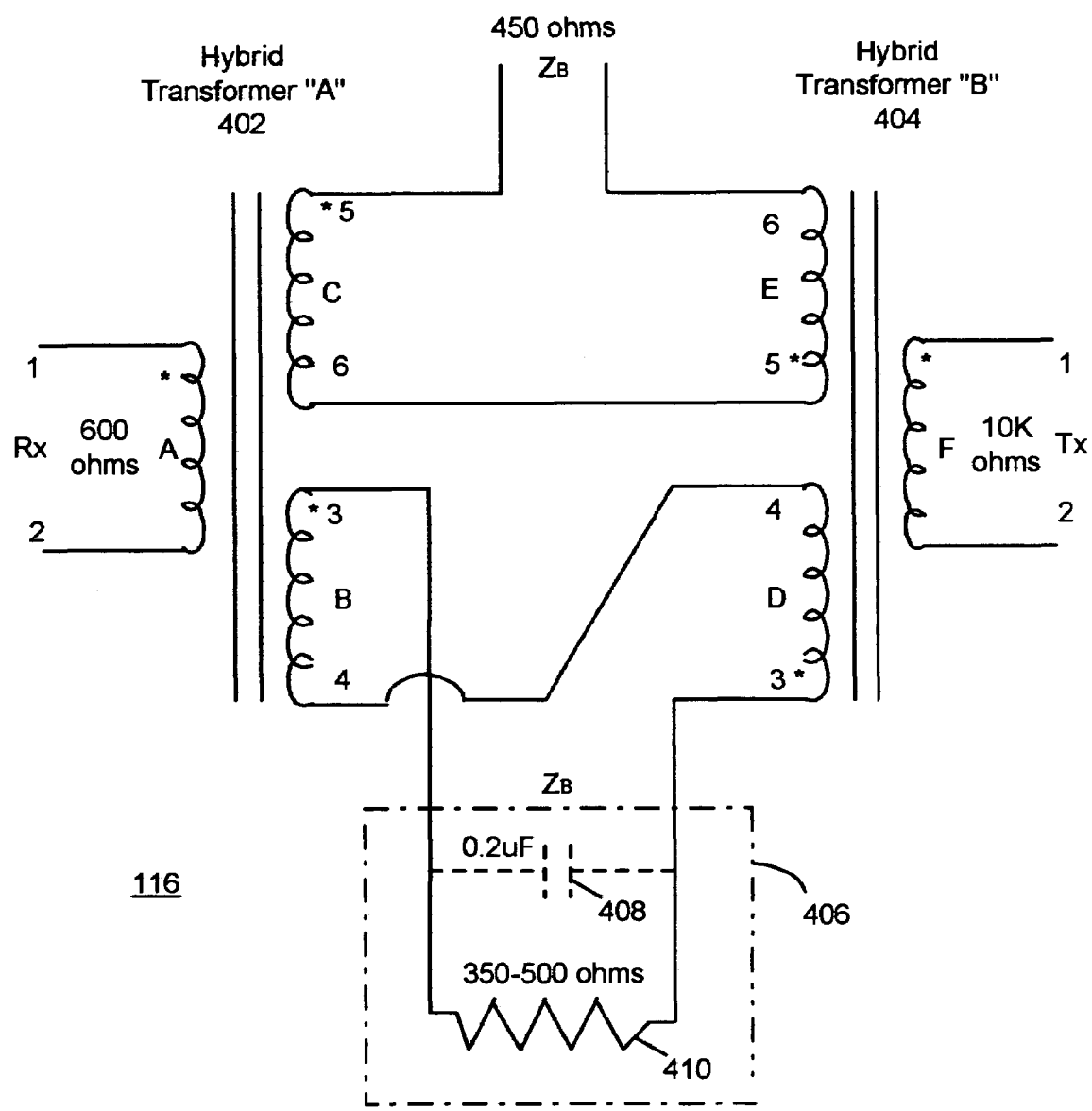
FIG. 4 is a schematic diagram of the hybrid transformer circuit for the interface adapter of FIG. 1 in a second embodiment.

Interface adapter 102 includes a hybrid transformer circuit 116 as well as a telephone jack 118, a speaker plug 122, a microphone plug 124, and a Universal Serial Bus (USB) plug 127 which are coupled to hybrid transformer circuit 116. Hybrid transformer circuit 116, which will be described later in detail in relation to FIGS. 2–4, is carried and contained entirely within a housing unit 120 (e.g. a molded hard plastic housing unit). Telephone jack 118 is carried on a side edge of housing unit 120 and is coupled to a conventional cordless telephone system 108 through a telephone cord. Preferably, telephone jack 118 is of the RJ-11 (female) type. Cordless telephone system 108 includes a cordless base unit 110 and at least one cordless handset unit 112. As is conventional, cordless base unit 110 and cordless handset unit 112 communicate via radio frequency (RF) signals 114 to provide mobility to an end user of cordless handset unit 112.

Figure 8:
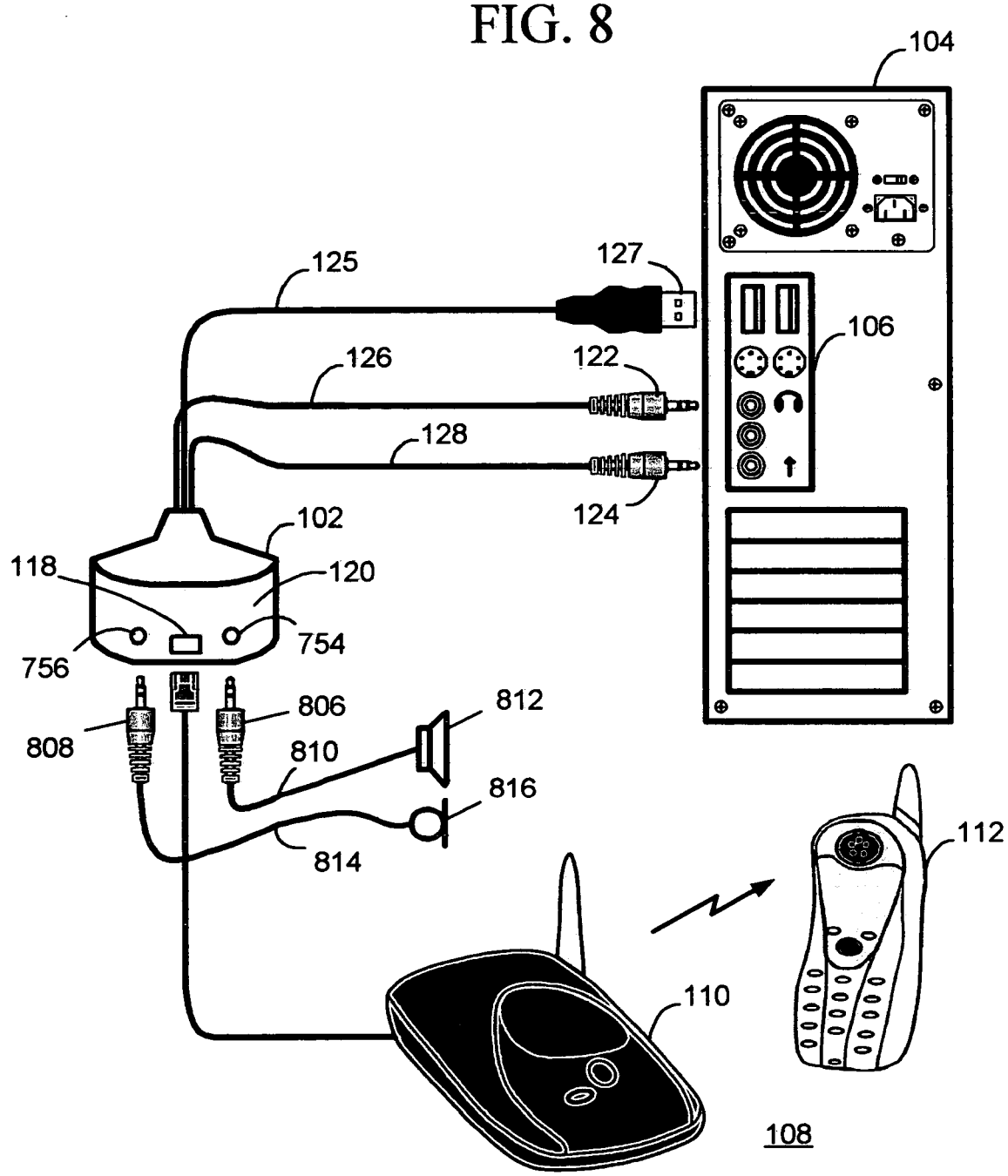
FIG. 8 is an illustration of the interfacing between the interface adapter and the computer with use of the circuit in FIG. 7.

The other end of interface adapter 102 is configured to connect to a standard sound card 106 of a computer 104, such as a Personal Computer (PC). In particular, speaker plug 122 and microphone plug 124 of interface adapter 102 are configured to interface with sound card 106. A speaker plug cable 126 extends from housing unit 120 and terminates with speaker plug 122. Similarly, a microphone plug cable 128 extends from housing unit 120 and terminates with microphone plug 124. Preferably, speaker plug 122 and microphone plug 124 are both male connectors of the ⅛" miniplug type. Sound card 106 has suitable female connectors of the ⅛" minijack type to receive the ⅛" miniplugs from interface adapter 102. In addition, USB plug 127 is configured to interface with a USB jack on the PC for receiving a bias voltage to bias circuits of cordless telephone system 108 through interface adapter 102. Speaker plug cable 126, microphone plug cable 128, and USB plug cable 125 may be bound together as a single cable which extends from housing unit 102 between about 24–40 inches (i.e. about 61–101 cm). FIG. 8 shows a visual representation of the interface adapter 102 which connects with computer 104 and cordless telephone system 108.

Referring back to FIG. 1, computer 104 connects to the Internet 132 through a local Internet Service Provider (ISP) 133. Sound card 106 of computer 104 converts analog voice signals from interface adapter 102 (which originated from cordless telephone system 108) into digital data for communication over the Internet 132. Conversely, sound card 106 converts digital voice data from the Internet 132 (which originated from telephone 136 or computer 142) into analog voice signals to interface adapter 102. A software application (not shown) which resides on computer 104 is utilized to help facilitate an instant voice messaging service, such as that service provided by MSN™ Messenger, America On-Line (AOL)™ Instant Messenger™, or Yahoo™ Messenger, or Skype™, which is based on Voice over IP (VoIP) technology.

Elements which exist outside of the home or office of the end user of cordless telephone system 108, or outside of the end user's purview 130, include the Internet 132, ISPs 133 and 146, telephone network 134, Internet-to-phone network server/gateway 138, as well as other end user's telephones 136 and 148, interface adapter 140, and computer 142. The other end user in the voice conversation may employ one of three alternatives: (1) telephone 136 via the standard telephone network 134; (2) computer 142 via the Internet 132 using a standard speaker/microphone attachment (attachment not shown) to computer 142; or (3) telephone 148 via the Internet 132 which is coupled to computer 142 via interface adapter 140.

If computer 142 with the speaker/mic attachment is utilized, the speaker/mic attachment is coupled to a sound card 144 of computer 142 which is coupled to the Internet 132 through local ISP 146. In this scenario, the voice communication does not require the use of telephone network 134 at all, except for any telephone connections established between computers 104/142 and their corresponding ISPs 133/146. The likelihood of undesirable echo generation in this scenario is very high if no echo cancellation is utilized by computer 104, since any voice signals from the speaker line will be fed to the microphone line and back to the origin. Suitable standard headphone sets are recommended for use so that acoustical echo will be eliminated.

On the other hand, telephone 148 and interface adapter 140 may be utilized with computer 142. Interface adapter 140 is similar in make and functionality as interface adapter 102 and, preferably, telephone 148 is a cordless telephone system (i.e. like cordless telephone system 108). In this scenario, the voice communication also does not require the use of telephone network 134 at all, except for any telephone connections established between computers 104/142 and their corresponding ISPs 133/146.

Using the last alternative, the end user of cordless telephone system 108 may have a subscription with an Internet-to-telephone network service provider, such as Net2Phone of Newark, N.J., U.S.A.; Callserve of London in the U.K.; or iConnectHere of DeltaThree, Inc. Such a service utilizes an Internet-to-telephone network server or gateway 138 and/or other devices for converting VoIP data packets from the Internet 132 into conventional telephone signals for use over telephone network 134, and vice versa. With such a subscription, the end user of cordless telephone system 108 may communicate over the Internet 132 and telephone network 134 with any other telephone user including the end user of telephone 136.

FIG. 2 is a schematic diagram of hybrid transformer circuit 116 of FIG. 1. Hybrid transformer circuit 116 of FIG. 2 includes a first hybrid transformer 202, a second hybrid transformer 204, and an impedance matching circuit 206. Hybrid transformers are used to convert a bidirectional two-wire signal into one-way four-wire signals. In the embodiment of FIG. 2, each hybrid transformer 202 and 204 is a 600Ω–600Ω single-hybrid transformer which connects a two-wire port (telephone set) to a four-wire transmit and receive port (PC sound card). Preferably, hybrid transformers 202 and 204 are single hybrid transformers of model SPT-180 available from Prem Magnetics, Inc., located in McHenry, Ill., U.S.A. Mouser Electronics located in Mansfield, Tex., U.S.A. may be another reliable source for hybrid transformers (e.g. Model TL028). However, any suitable hybrid transformer from any suitable manufacturer may be utilized. FIG. 3 shows the same hybrid transformer circuit 116 coupled in its environment which is illustrated by equivalent circuit information (i.e. equivalent circuit voltages and impedances).

In FIGS. 2–3, hybrid transformer 202 has a pair of mutually-coupled coils which include mutually-coupled coils B and D and mutually-coupled coils A and C formed along the same core. Similarly, hybrid transformer 204 has a pair of mutually-coupled coils which include mutually-coupled coils F and H and mutually-coupled coils E and G formed along the same core. A terminal 1 of coil B and a terminal 6 of coil A of hybrid transformer 202 are coupled to speaker plug 122 (FIG. 1), whereas a terminal 1 of coil G and a terminal 6 of coil H of hybrid transformer 204 are coupled to microphone plug 124 (FIG. 1). A terminal 7 of coil D and a terminal 12 of coil F are coupled to two-line telephone jack 118 (FIG. 1). A terminal 8 of coil D of hybrid transformer 202 is coupled to a terminal 11 of coil F of hybrid transformer 204. A terminal 12 of coil C of hybrid transformer 202 is coupled to a terminal 8 of coil E of hybrid transformer 204, which makes coils C and coils E reverse-coupled. A terminal 11 of coil C of hybrid transformer 202 and a terminal 7 of coil E of hybrid transformer 204 are coupled to impedance matching circuit 206 which has an impedance $Z_B$. In this embodiment, impedance matching circuit 206 includes a resistor 210 and an optional capacitor 208 coupled in a parallel configuration as shown.

Assuming a change of current in coil A, a change will be produced in the magnetic field of the same coil which, in turn, produces a change of voltage in coil C on the same transformer core. When coil C is connected in a circuit, changes in voltage in the circuit will generate a change in current flow. Therefore, the pattern of change of current in the primary coil A is reproduced in the transformer's secondary coil C without both circuits having to be physically connected. Note that the ratio of incoming voltage to outgoing voltage (and of incoming current to outgoing current) depends on the ratio of the number of turns of the primary and secondary windings. This makes it possible to equalize the impedance between the coupled circuits (i.e. the sound card and the cordless telephone) as $N^2 \times Zp$, where N is the ratio of secondary-to-primary coil turns of the transformer and Zp is the impedance of the primary coil. Impedance matching is important to reduce the reflection of transmitted signals and corresponding loss of power. Preferably, the ratio N for both transformers 202 and 204 is between 1:1.60 (+/−2%) using the SPT-180 type transformers.

A voice signal is received from the sound card (i.e. speaker line) that is applied to terminals 1 and 6 of transformer A 202, next to be coupled inductively to its coils C and D owing to the flow of current through coils A and B. The voltage induced in coil D causes current to flow through the two-wire circuit connected to terminal 7 of hybrid transformer 202 and terminal 12 of hybrid transformer 204, to be transmitted further on. This same current also flows through coil F, which causes an induced voltage in coil H. Likewise, the voltage of the voice signal induced in coil C causes current to flow through impedance matching circuit 206 and coil E. The impedance $Z_B$ of impedance matching line, thereby obtaining zero return of the transmitted signal toward its origin. That is, the impedance $Z_B$ of impedance matching circuit 206 is set during the design phase to match the line impedance $Z_L$ which may vary slightly from device to device. Given that $Z_B$ is equal to $Z_L$, the number of turns in coils C and D are equal in number, and the number of turns in coils E and F are also equal in number, the same flow of current exists in the circuits of coils C and E and D and F, thereby yielding the same voltage induced in coils G and H (each of which also have the same number of turns).

In general, impedance matching circuit 206 may have an impedance $Z_B$ between about 350 and 500Ω. Preferably, the impedance $Z_B$ may be set to between about 457 and 467Ω. Most preferably, a fixed high-precision resistor (e.g. preferably a 1% tolerance or less) having a resistance of about 467Ω is utilized. Capacitor 208, which is entirely optional, may have any suitable capacitance (e.g. about 0.2 μF) to filter out any undesirable high-frequency components.

Coils C and E have their connections inverted from the connections of coils D and F so that any voltage induced in coil G is opposite in phase to the voltage induced in coil H, opposing it and resulting in the cancellation of both. The signal appearing at terminals 1 and 6 of hybrid transformer 202 (i.e. speaker line) is transmitted to terminals 7 and 12 without appearing at terminals 1 and 6 of hybrid transformer 204 (i.e. microphone line). The level of the signal transmitted at terminals 7 (hybrid transformer 202) and 12 (hybrid transformer 204) (i.e. the telephone set line) is half the level of the incoming signal at terminals 1 and 6 of hybrid transformer 202 (i.e. speaker line), as the other half of the signal is dissipated in impedance matching circuit 206. When a voice signal is received from the telephone set at terminals 7 and 12 of hybrid transformers 202 and 204, its magnitude at both the sound card speaker line and the sound card microphone line will be only half of the original signal. The reason is that coil D of hybrid transformer 202 and coil F of hybrid transformer 204 are connected in series with the telephone set as shown. The level of the voice signal injected at the sound card microphone input (terminals 1 and 6 of hybrid transformer 204) may be increased at the other end using a PC volume control. When ZL=ZB, any signal coming from the sound card speaker line through coils A and B of hybrid transformer 202 will establish voltages in coils H and G of hybrid transformer 204. These voltages will be equal and opposite in value (i.e. 180° out-of-phase), canceling each other out with resulting echo cancellation. Ideally, no signal originating from the sound card speaker line will be allowed to return back to its origin through the sound card microphone.

What has been shown and described reveals that the basis of hybrid transformer circuit 116 is the multiple windings or coils that make up the transformers. Voice signals are transferred between the same coils through electromagnetic coupling and, where couplings with opposite electromagnetic fields result, they will be canceled out. That is, by using the basic principle of the law of electromagnetism (equal but opposite-phase electromagnetic fields), the voice echo generated by transmitting two different voice signal paths simultaneously can be canceled out. Therefore, two superposed alternating current (AC) signals can be transmitted by a single pair of wires and recovered individually without interfering with each other through the use of hybrid transformer circuit 116.

Referring specifically to FIG. 3, $V_{TM}$ is the voltage from the telephone set microphone, $V_{TS}$ is the voltage to the telephone set speaker, $V_{RX}$ is the voltage from the sound card speaker output, and $V_{TX}$ is the voltage to the sound card microphone input. When the speaker line is driven from the PC, then $V_{TS}=0.55V_{RX}$ and $V_{TX}=0$ as long as $Z_B=Z_L$. If $Z_B$ were different from $Z_L$, then $V_{TX}$ would be a non-zero value which results in a reflected echo signal back to the other end, which is undesirable. When the microphone line is driven, a voice signal from the telephone set is being injected into the microphone line with a voltage of $V_{TX}=0.5V_{TM}$. Even though the voltage of the signal coming from the telephone set is reduced by one half, its level is still sufficient to be transmitted through the microphone line which can be amplified using a volume control on the PC on the other end.

Electromagnetic mutual coupling between hybrid transformers is reduced by improving the separation between the receiver and the transmitter in the four-wire circuit. This results in a reduction of the signal reflection. "Hybrid balance", which is terminology related to return loss, is the degree of electrical symmetry between two impedances connected to two conjugate sides of a hybrid circuit for minimizing cross-over signals between the transmit and receive sides. This is achieved by utilizing appropriate transformer turn ratios, appropriate core materials, as well as appropriate inductances. The symmetry of the signals transmitted and received is improved as impedance $Z_B$ of the balance network is carefully equalized with the impedance $Z_L$ from telephone set line for all transmitted frequencies of interest, as by using precise construction techniques in the transformer coils (i.e. precision in the ratio of winding turns during manufacture of the transformers).

The termination of impedance between the sound card and the cordless telephone is provided by coupling of the hybrid system on each side of the transmission/reception with an appropriate balance network. Leakage and inductances for the cores of the transformers and the capacitances between coils will result in reflection of signals at frequencies at which their impedances are significant. If these effects are ignored and the ratio of the coils is assumed to be equal, the termination of impedances jointly with the appropriate balance network will achieve echo cancellation and a clear and comfortable voice conversation over the Internet.

The first embodiment described in relation to FIGS. 2–3 utilizes hybrid transformers having relatively large cores, such as SPT-180-type transformers previously described. However, a second embodiment uses transformers with relatively smaller cores, such as SPT-060 type transformers which are also available from Prem Magnetics, Inc. or Model TL028 transformers from Mouser Electronics. This second embodiment is shown and described in relation to FIG. 4.

The hybrid transformer circuit 116 of FIG. 4 includes a hybrid transformer 402, a hybrid transformer 404, and an impedance matching circuit 406. Hybrid transformer 402 includes a coil A which is inductively coupled to both coils B and C formed along the same core. Similarly, hybrid transformer 404 includes a coil F which is inductively coupled to both coils D and E formed along the same core. Terminals 1 and 2 of coil A of hybrid transformer 402 are coupled to speaker plug 122 (FIG. 1), whereas terminals 1 and 2 of coil F of hybrid transformer 404 are coupled to microphone plug 124 (FIG. 1). A terminal 5 of coil C of hybrid transformer 402 and a terminal 6 of coil E of hybrid transformer 404 are coupled to two-line telephone jack 118 (FIG. 1). A terminal 6 of coil C of hybrid transformer 402 is coupled to a terminal 5 of coil E of hybrid transformer 404. A terminal 4 of coil B of hybrid transformer 402 is coupled to a terminal 4 of coil D of hybrid transformer 404, making coils B and D reverse-coupled. A terminal 3 of coil B of hybrid transformer 402 and a terminal 3 of coil D of hybrid transformer 404 are coupled to impedance matching circuit 406 which has an impedance $Z_B$. In this embodiment, impedance matching circuit 406 includes a resistor 410 and an optional capacitor 408 (optional) coupled in a parallel configuration as shown. The impedance $Z_B$, capacitor 408, and resistor 410 may be the same or similar components as described in relation to FIGS. 2–3.

Although the physical dimensions of the two transformers of FIG. 4 are different, their behavior and performance in this application are very similar. And although the number of coils in the second configuration of FIG. 4 differs by two (one in transmitting part Tx and the other in receiving part Rx), the explanation described above in relation to FIGS. 2–3 is applicable here as well. For the purposes of mass production of the interface adapter, it has been considered more suitable to use a configuration with SPT-060 hybrid transformers (Prem Magnetics) or TL028 hybrid transformers (Mouser Electronics) due to the great economic savings it represents for manufacturing relative to the use of the SPT-180 transformers. In this embodiment, the ratio N for both transformers 402 and 404 is between 1:1.60 (+/−2%) for the SPT-060 type.

Figure 5:
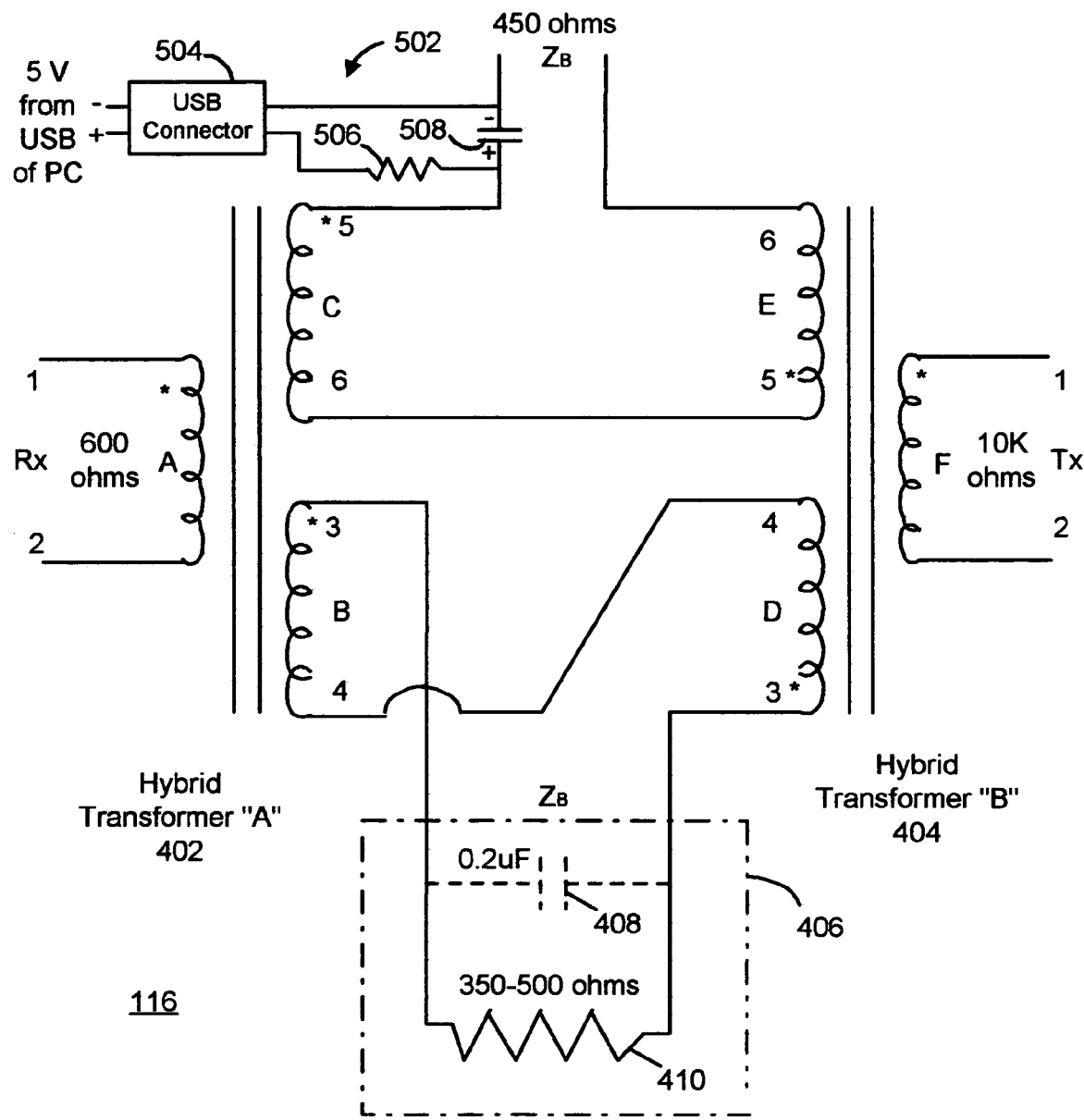
FIG. 5 is the schematic diagram of the hybrid transformer circuit of FIG. 4 which further includes a voltage bias interface.

FIG. 5 is a schematic diagram of the hybrid transformer circuit 116 of FIG. 4 which further includes a voltage biasing interface 502. Although shown with respect to FIG. 5, voltage biasing circuit 502 may be utilized in hybrid transformer circuit 116 of FIGS. 2 and 3 as well. Voltage biasing interface 502 is utilized for biasing circuits of some cordless telephone sets which require it; however not all cordless telephone system will require such biasing. In general, voltage biasing interface 502 is adapted for coupling to a voltage source which provides a bias voltage to the cordless telephone system through hybrid transformer circuit 116. More particularly, voltage biasing interface 502 utilizes a USB plug 504 and cable which is coupled to one of the lines of the telephone interface (RJ-11 female jack) of the interface adapter. As particularly shown in FIG. 5, USB plug 504 is coupled through terminal 5 of coil C of hybrid transformer 402. USB is a high-performance networking standard which is based on a serial bus architecture. Most new computers and associated peripheral devices like printers and scanners support USB.

USB plug 504 is adapted to be connected to a corresponding USB jack on the computer/PC. The voltage bias obtained from the USB is about 5 volts (+5 volts line and ground line), which provides a sufficient voltage bias for most (if not all) of such cordless telephone sets. The USB cable extends from housing 120 (FIG. 1) in a manner similar to cables 126 and 128 (FIG. 1). Preferably, as described above, the USB cable and cables 126 and 128 (FIG. 1) are integrally combined (bundled) along a single cable strand and split at the end into separate connectors. Note that only positive and negative terminals of USB plug 504 are coupled to hybrid transformer circuit 116; all other lines (e.g. data lines) of USB plug 504 are not utilized. A capacitor 508 of the electrolytic type is coupled between the telephone set line and terminal 5 (coil C) of hybrid transformer 402 as shown in FIG. 5; the positive and negative terminals from USB plug 504 are coupled across this capacitor 508. Also, a current-limiting resistor 506 is coupled along the positive terminal as shown in FIG. 5. Preferably, the resistance of resistor 506 is about 62Ω (rated at ¼ Watt) and the capacitance of capacitor 508 is about 470 µF (rated at 6.3 volts). It is important to note that, even though voltage biasing interface 502 is utilized in this embodiment, hybrid transformer circuit 116 of FIG. 5 still consists entirely of passive components.

Figure 6:
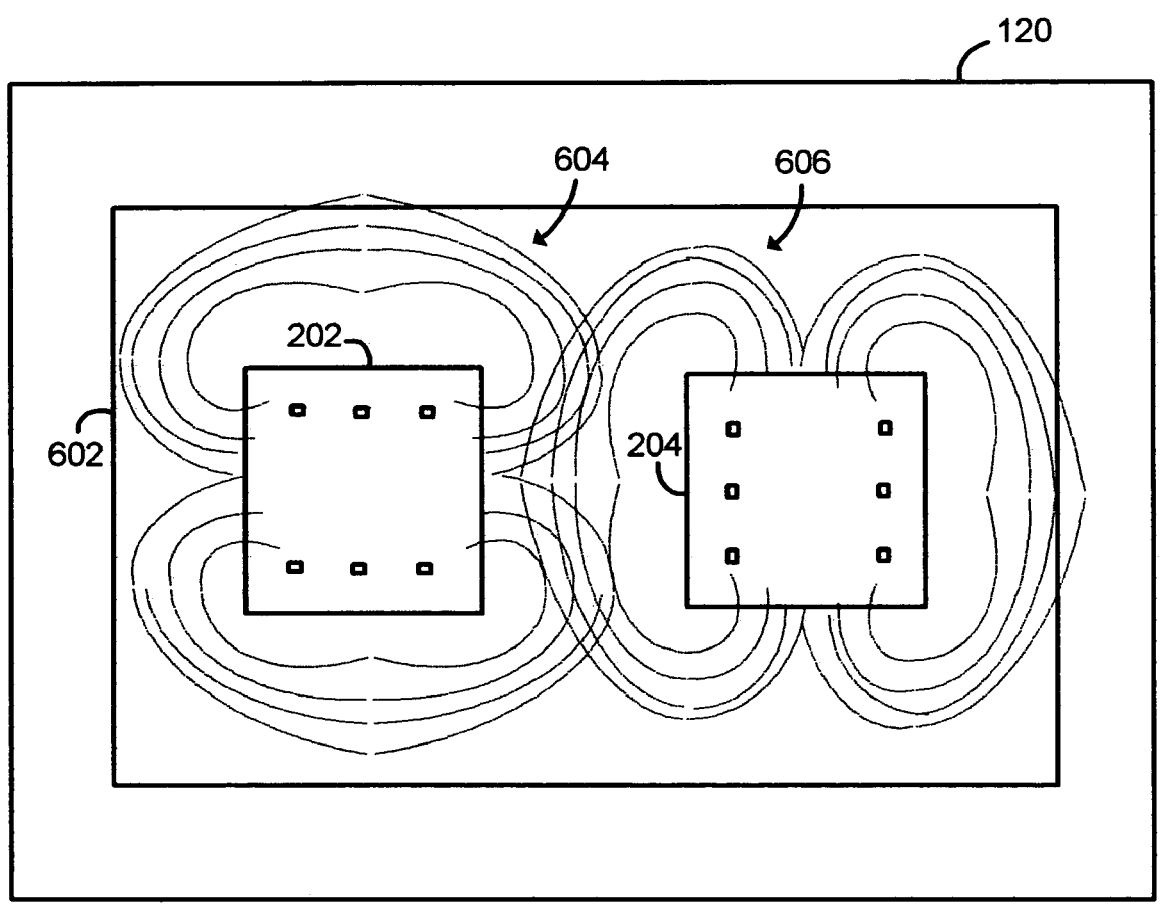
FIG. 6 is a block diagram illustration of the two hybrid transformers of the hybrid transformer circuit, which are physically oriented 90° out-of-phase in the housing so as to reduce electromagnetic interference with one another.

Turning now to FIG. 6, an illustration of hybrid transformers 202 and 204 of the hybrid transformer circuit in housing unit 120 is shown. Hybrid transformers 202 and 204 are mounted and coupled on a printed circuit board (PCB) 602 which is contained within housing unit 120. Hybrid transformers 202 and 204 must be positioned relatively close together on PCB 602 to ensure that the size of the interface adapter is small. However, hybrid transformer 202 has electromagnetic waves 604 that radiate primarily out of one side thereof, and hybrid transformer 204 similarly has electromagnetic waves 606 that radiate primarily out of another side thereof Positioning hybrid transformers 202 and 204 close to one another would tend to cause interference, which would provide an impedance mismatch and increase voice echo.

In the present application, however, hybrid transformers 202 and 204 are oriented so as to be perpendicular to one another (i.e. rotated 90° out-of-phase with each other) to reduce or minimize mutual electromagnetic coupling. Thus, hybrid transformers 202 and 204 may still be positioned relatively closely on PCB 602 to conserve space within housing unit 120 without electromagnetically interfering with one another. In this embodiment, hybrid transformers 202 and 204 each have dimensions of about ½" by ½" (1.27 cm), are spaced apart by about 1 inch (2.54 cm), and the dimension of PCB 602 is about 1.1 by 2.3 inches (2.8 by 5.8 cm). As apparent, the interface adapter can be made relatively smaller in size without adversely affecting the performance of the adapter. Although being rotated 90° out-of-phase is preferred for good results, any suitable rotation between 45°–135° may be utilized to reduce undesirable electromagnetic coupling. Thus, hybrid transformer 202 and 204 are physically oriented within housing unit 120 so as to reduce electromagnetic interference with one another for conserving space within the housing unit 120.

As described earlier, the interface adapter is used to interface a standard cordless telephone to a computer sound card. The function of the interface adapter is to provide the user with mobility when making an Internet telephone call. The speaker and microphone plugs of the interface adapter are connected to the appropriate computer sound card inputs, and a cordless telephone is connected to the RJ-11 connector of the interface adapter. Without any special mechanism in the interface adapter to assist the user, however, the user would undesirably have to disconnect and reconnect external computer speakers and microphone from the computer every time an Internet telephone call is made using the interface adapter and cordless telephone.

To avoid disconnecting and reconnecting the external computer speakers and microphone from the computer when making an Internet telephone call, the preferred embodiment of the invention allows the user to permanently connect the external speakers and microphone directly to the interface adapter. The preferred embodiment of the present invention is shown and described in relation to FIGS. 7 and 8.

With reference first to FIG. 8, a visual representation of the interfacing between interface adapter 102, computer 104, and external speakers 812 and microphone 816 is shown. External computer speaker and microphone jacks 754 and 756 are exposed on housing 120 of interface adapter 102 to achieve the speaker/mic coupling. External speakers 812 (typically two) and microphone 816 have cables 810 and 814, respectively, which terminate into speaker and microphone plugs 806 and 808, respectively, for connecting into speaker and microphone jacks 754 and 756, respectively. Speaker and microphone plugs 806 and 808 are both male connectors of the ⅛" miniplug type, whereas speaker and microphone jacks 754 and 756 are female connectors of the ⅛" minijack type to receive such ⅛" miniplugs.

Figure 7:
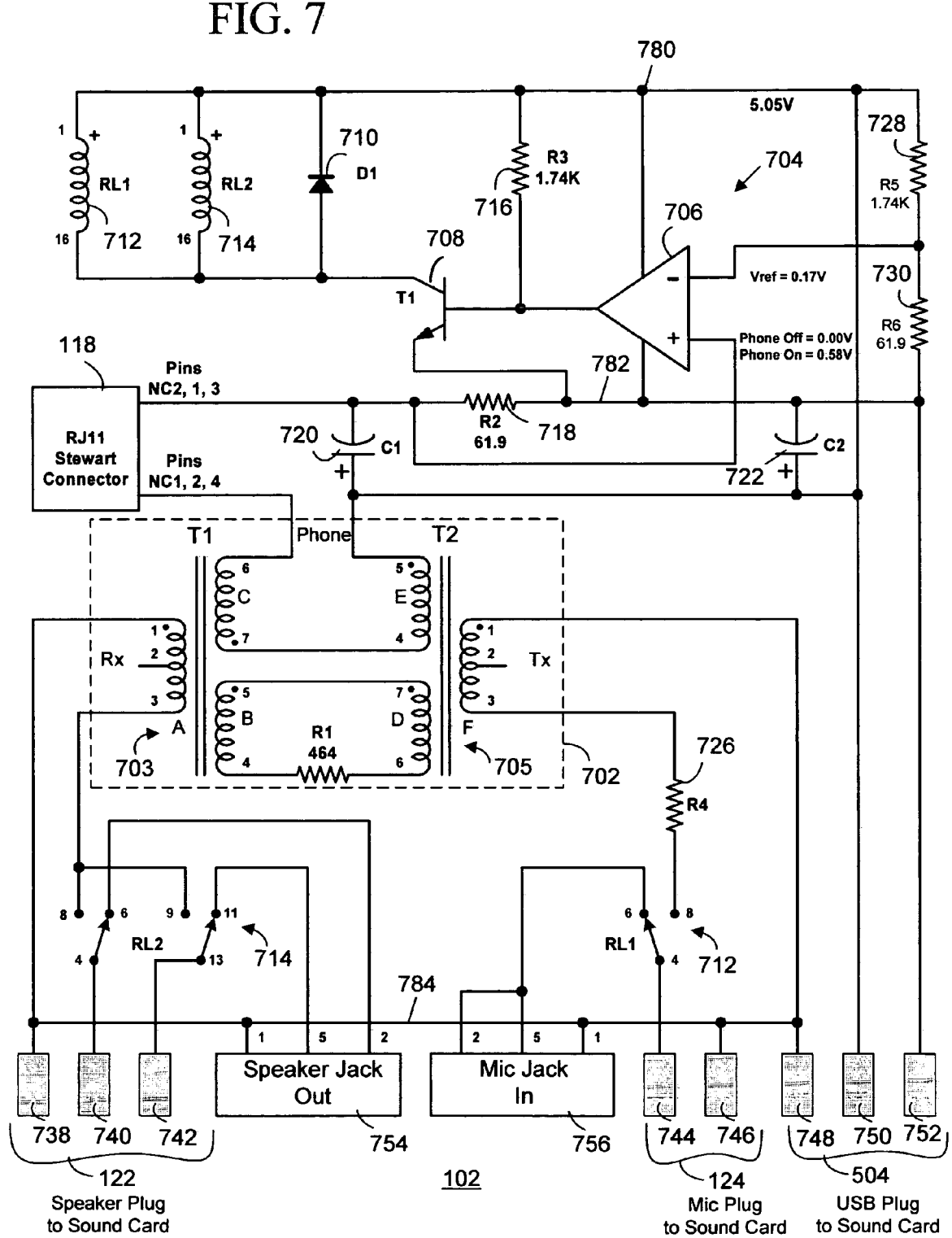
FIG. 7 is a preferred embodiment of the present invention, which is similar to that shown and described in relation to FIGS. 4–5 but includes a control circuit for automatically switchably coupling the computer sound card to either external speakers and microphone or the cordless telephone as appropriate.

Interface adapter 102 may utilize the circuit of FIG. 7 for the configuration shown in FIG. 8. Speaker plug 122 in FIG. 7 is associated with speaker plug contacts 738, 740, and 742. Similarly, microphone plug 124 is associated with microphone plug contacts 744 and 746. In addition, USB plug 504 is associated with USB plug contacts 748, 750, and 752. Notably, the circuit of FIG. 7 includes a hybrid transformer circuit 702 as well as a control circuit 704 for automatically switching interface adapter 102 between a "standard computer audio mode" and "cordless telephone mode".

Hybrid transformer circuit 702 of FIG. 7 is based on the hybrid transformer circuit shown and described in relation to FIGS. 4–5 with substantially the same operation. Hybrid transformer circuit 702 includes a first hybrid transformer 703 having coils A, B, and C and a second hybrid transformer 705 having coils D, E, and F. In first hybrid transformer 703, coil A is inductively coupled with coils B and C which are formed along the same core. In second hybrid transformer 705, a coil F which is inductively coupled with coils D and E which are formed along the same core. A first terminal of coil C and a first terminal of coil E are coupled to telephone jack 118, and a second terminal of coil C is coupled to a second terminal the coil E. A first terminal of coil E is coupled to telephone jack 118 (pins NC2, 1, and 3) through a capacitor (described in more detail below). First and second terminals of coil A are for coupling to speaker plug 122, whereas first and second terminals of coil F are for coupling to microphone plug 124. A first terminal of coil B is coupled to a first terminal of coil D. A second terminal of coil B and a second terminal of the coil D are coupled to an impedance matching circuit consisting of a resistor (e.g. R1 at about 464Ω) in a reverse-coupled fashion.

As previously mentioned, the circuit of FIG. 7 includes control circuit 704 for automatically switching interface adapter 102 between a standard computer audio mode and cordless telephone mode. With reference to both FIGS. 7–8, control circuit 704 detects when cordless telephone system 108 is off-hook and, in response, automatically switchably couples hybrid transformer circuit 702 to computer sound card 106 (i.e. for the cordless telephone mode). Control circuit 704 also detects when cordless telephone system 108 is on-hook and, in response, automatically switchably couples external speakers and microphone 812 and 816 (FIG. 8) to computer sound card 106 (i.e. for the standard computer audio mode).

As depicted in FIG. 7, control circuit 704 includes a comparator 706 having an amplifier, a transistor switch 708 (T1), relays 712 and 714 (RL1 and RL2), a diode 710 (D1), resistors 716, 718, 726, 728, and 730, and capacitors 720 and 722. A positive bias voltage (e.g. 5.05 volts) is provided between reference nodes 780 and 782. The circuit receives the positive bias voltage through USB plug 504, specifically via USB plug contact 750 (positive) and USB plug contact 752 (negative). Comparator 706 is coupled directly to and biased via reference nodes 780 and 782 which are power supply connections thereto. Note that the first terminal of the coil E of second hybrid transformer 705 is coupled to telephone jack 118 (pins NC2, 1, and 3) through capacitor 720 (e.g. C1 at about 470 μF) and is biased by reference node 780. Note also that capacitor 720 is the same as capacitor 508 of FIG. 5. A common signal ground at node 784 is provided with the coupling of speaker plug contact 738 (shield), microphone plug contact 746 (shield), USB plug 748 (shield), pin 1 of speaker jack 754 (shield), pin 1 of microphone jack 756 (shield), a first terminal of coil A of first hybrid transformer 703, and a first terminal of coil F of second hybrid transformer 705. Control circuit 704 ground is referenced to node 782 (+5.05 volt ground) and is isolated from common signal ground node 784 to prevent power supply switching noise from reaching the audio circuits of interface adapter 102.

Relays 712 and 714 have mechanical characteristics represented as two sets of switches near the bottom of FIG. 7. As shown, a first switch of relay 714 includes pins 4, 6, and 8 (switchably coupling pin 4 between pins 6 and 8) and a second switch of relay 714 includes pins 9, 11, and 13 (switchably coupling pin 13 between pins 9 and 11). For the first switch of relay 714, pin 4 is coupled to speaker plug contact 740, pin 6 is coupled to pin 2 of speaker jack 754, and pin 8 is coupled to the second terminal of coil A of first hybrid transformer 703. This is for the first external speaker (e.g. left stereo speaker). For the second switch of relay 714, pin 13 is coupled to speaker plug contact 742, pin 11 is coupled to pin 5 of speaker jack 754, and pin 9 is coupled to the second terminal of coil A of first hybrid transformer 703. This is for the second external speaker (e:g. right stereo speaker). The switch of relay 712 includes pins 4, 6, and 8, where pin 4 is switchably coupled between pins 6 and 8. For the switch of relay 712, pin 4 is coupled to microphone plug contact 744, pin 6 is coupled to pins 2 and 5 of microphone jack 756, and pin 8 is coupled to the second terminal of coil F of second hybrid transformer 705 through resistor 726 (R4 at about 10 K Ω).

Relays 712 and 714 also have electrical characteristics represented as inductors RL1 and RL2 near the top of FIG. 7. The inductors of relays 712 and 714 have ends which are coupled to reference node 780 and are coupled in parallel with each other. Diode 710 has a cathode which is coupled to reference node 780 and is coupled in parallel with the inductors, such that current flow is limited to a single direction. Resistor 716 (e.g. R3 at about 1.74 K Ω) has a first end coupled to reference node 780 and a second end coupled to the base of transistor switch 708 and the output of comparator 706. A collector of transistor switch 708 is coupled to an anode of diode 710, and an emitter of transistor switch 708 is coupled to reference node 782. In this configuration, diode 710 serves to protect transistor switch 708 by clamping its collector to approximately 6 volts (i.e. 5.05 volts+0.95 volt diode clamping voltage). Resistor 718 (e.g. R2 at about 61.9Ω) is coupled between reference node 782 and telephone jack 118 (pins NC2, 1, and 3). Capacitor 722 (e.g. C2 at about 470 μF) is coupled between reference nodes 780 and 782. Capacitor 720 provides a 4.5 volt bias to enable some cordless telephone systems, whereas capacitor 722 is used to filter any power supply noise.

A first (positive) input of comparator 706 is coupled to telephone jack 118 (pins NC2, 1, 3 and 3) for receiving an on-hook/off-hook detection voltage from the cordless telephone system. In this embodiment, the on-hook detection voltage (phone off) is about 0.00 volts and the off-hook detection voltage (phone on) is about 0.58 volts. Resistor 728 (R5 at about 1.74 K Ω) and resistor 730 (R6 at about 61.9Ω) are coupled in series between reference nodes 780 and 782, and have connecting ends which provide a fixed reference voltage (e.g. about 0.17 volts) to a second (negative) input of comparator 706. The fixed reference voltage may be referred to as a threshold voltage.

When the cordless telephone system is "on-hook", interface adapter 102 is in the standard computer audio mode. In this case, the phone connection at telephone jack 118 is an open circuit, causing no current flow through resistor 718. This keeps the first input of comparator 706 at or near ground (e.g. 0.00 volts) which in turn forces the output of comparator 706 at or near ground. Thus, transistor switch 708 is in an off state, keeping both relays 712 and 714 in a non-energized state. When relays 712 and 714 are in the non-energized state, the external speaker(s) connected to speaker jack 754 are coupled to the computer sound card via speaker plug 122, and the external microphone connected to microphone jack 756 is coupled to the computer sound card via microphone plug 124. Specifically, pins 4 and 6 of relay 714 are switchably coupled together, pins 11 and 13 of relay 714 are switchably coupled together, and pins 4 and 6 of relay 712 are switchably coupled together. This non-energized state of relays 712 and 714 is the one which is depicted in FIG. 7. Audio signals from the computer sound card are carried through speaker plug 122 to speaker jack 754 and ultimately to the external speaker(s); audio signals from the external microphone are carried through microphone jack 756 to microphone plug 124 and to the computer sound card. Note that interface adapter 102 remains in the standard computer audio mode even when USB plug 504 of interface adapter 102 is disconnected from the computer's USB port.

When the telephone is picked up and the "TALK" button is depressed, the cordless telephone system goes "off-hook". When the cordless telephone system is "off-hook", interface adapter 102 is in the cordless telephone mode. A resistance of about 1 K Ω or less appears between pins 2 and 3 of telephone jack 118. This resistance allows at least 4.5 mA of current to flow through resistor 718, elevating the first input of comparator 706 to at least 0.25 volts. This allows the output of comparator 706 to float high, which in turn activates transistor switch 708, which in turn energizes relays 712 and 714. When relays 712 and 714 become energized, the external speakers and microphone are disconnected from the computer sound card and hybrid transformer circuit 702 is switched to the computer sound card. Specifically, pins 4 and 8 of relay 714 are switchably coupled together, pins 9 and 13 of relay 714 are switchably coupled together, and pins 4 and 8 of relay 712 are switchably coupled together. Thus, the first and second terminals of coil A of first hybrid transformer 703 are coupled to speaker plug contacts 738, 740, and 742. Similarly, the first and second terminals of coil F of second hybrid transformer 705 are coupled to microphone plug contacts 744 and 746. Thus, to allow an Internet telephony conversation, the energization of relay 714 switches speaker plug 122 from the external speaker(s) which are connected to speaker jack 754 to hybrid transformer circuit 702; the energization of relay 712 switches microphone plug 124 from the external microphone which is connected to microphone jack 756 to hybrid transformer circuit 702.

A brief summary of the circuit configuration, as its relates to the connection of external speakers and microphone and the control circuit, follows. Speaker jack 754 is configured to connect with external speaker 812 through speaker cable 810 (FIG. 8), and microphone jack 756 is configured to connect with external microphone 816 through microphone cable 814 (FIG. 8). Control circuit 704 is operative to switchably couple speaker and microphone plugs 122 and 124 to speaker and microphone jacks 754 and 756, respectively, in response to detecting a telephone on-hook condition. In this "standard computer audio mode" configuration, audio signals from computer 104 may be heard through external speakers 812 and audio signals from microphone 816 may be received at computer 104. Control circuit 704 is further operative to switchably couple speaker and microphone plugs 122 and 124 to first and second hybrid transformers 103 and 705 (i.e. first and second terminals of coils A and F), respectively, in response to detecting a telephone off-hook condition. In this "cordless telephone mode" configuration for Internet voice telephony, audio signals from computer 104 may be heard through the speaker of cordless telephone 112 and audio signals from the microphone of cordless telephone 112 may be received at computer 104. In a specific embodiment, control circuit 704 includes transistor switch 708; comparator 706 having a first input coupled to telephone jack 118, a second input coupled to a reference voltage, and an output coupled to an input of transistor switch 708; relay 712 for switchably coupling microphone plug 124 between microphone jack 756 and second hybrid transformer 705 (i.e. first and second terminals of coil F) responsive to the output of transistor switch 708; and relay 714 for switchably coupling speaker plug 122 between speaker jack 754 and first hybrid transformer 703 (i.e. first and second terminals of coil A) responsive to the output of transistor switch 708.

What has been described herein is a cordless telephone-to-sound card interface adapter that will allow Internet users to establish PC-to-telephone and PC-to-PC voice conversations over the Internet by means of instant messaging using their PC and any standard cordless telephone, freeing them from sitting idly in front of their PC and offering mobility while they talk anywhere in their homes or offices. Most preferably, the interface adapter utilizes 100% passive components for its operation, which makes it more affordable and leads to fewer risks of electrical discharges. The interface adapter consists of a hybrid transformer circuit for matching the impedance between a PC sound card (600Ω impedance from the speaker and 10 K Ω impedance from the microphone) and the cordless telephone (nominal impedance of 450Ω), thereby minimizing and/or canceling out voice echo during telephone conversations over the Internet.

The interface adapter may also include interfaces for connecting with external computer speakers and microphone, as well as a control circuit for automatically switching between a standard computer audio mode and cordless telephone mode. The standard computer audio mode involves a connection between the computer sound card and the external speakers and microphone, while the cordless telephone mode involves a connection between the computer sound card and the cordless telephone. Advantageously, the interface adapter provides a low-cost yet effective means to provide mobility for an end user during voice communications over the Internet.

In the preferred embodiment, the interface adapter includes a housing unit and a hybrid transformer circuit carried in the housing unit which includes a first hybrid transformer, a second hybrid transformer coupled to the first hybrid transformer, and an impedance matching circuit coupled to the first and the second hybrid transformers. The first hybrid transformer includes a coil A which is inductively coupled with coils B and C formed along the same core. The second hybrid transformer including a coil F which is inductively coupled with coils D and E formed along the same core. A speaker plug is for coupling to the first hybrid transformer and is configured to connect to a speaker jack of a computer sound card. A microphone plug is for coupling to the second hybrid transformer and is configured to connect to a microphone jack of the computer sound card. A telephone jack is coupled to the first and the second hybrid transformers and is configured to connect to a cordless telephone system with a telephone cord. Preferably, a Universal Serial Bus (USB) interface is also provided to supply a bias voltage to the cordless telephone system through the interface adapter. The interface adapter may also include a speaker jack configured to connect with an external speaker, and a microphone jack configured to connect with an external microphone. A control circuit coupled to the hybrid transformer circuit includes a transistor switch; a comparator having a first input coupled to the telephone jack, a second input coupled to a reference voltage, and an output coupled to an input of the transistor switch; a first relay for switchably coupling the speaker plug between the speaker jack and the first hybrid transformer responsive to an output of the transistor switch; and a second relay for switchably coupling the microphone plug between the microphone jack and the second hybrid transformer responsive to the output of the transistor switch.

The above-described embodiments of the present application are examples only. Those of skill in the art may effect alterations, modifications and variations to the particular embodiments without departing from the scope of the application. For example, although the use of a cordless telephone system is a primary focus of the present application, the interface adapter of the present invention may be utilized with any standard telephone set. Although the circuit of FIG. 7 utilized the hybrid transformer circuit shown and described in relation to FIGS. 4–5, any of the other hybrid transformer circuits may be utilized in that circuit. The invention described herein in the recited claims intends to cover and embrace all suitable changes in technology.

What is claimed is:

1. A cordless telephone-to-sound card interface adapter for providing mobility to an end user during voice communications over the Internet, comprising:
    a housing unit;
    a hybrid transformer circuit carried in the housing unit;
    the hybrid transformer circuit including:
        a first hybrid transformer;
        a second hybrid transformer coupled to the first hybrid transformer;
        an impedance matching circuit coupled to the first and the second hybrid transformers;
        the first hybrid transformer including a coil A which is inductively coupled with coils B and C formed along the same core;
        the second hybrid transformer including a coil F which is inductively coupled with coils D and E formed along the same core;
    a telephone jack coupled to the first and the second hybrid transformers and being configured to connect to a cordless telephone system with a telephone cord;
    a speaker plug contact for coupling to a speaker plug which is configured to connect to a speaker jack of a computer sound card;
    a microphone plug contact for coupling to a microphone plug which is configured to connect to a microphone jack of the computer sound card;
    a speaker jack which is configured to connect with an external speaker;
    a microphone jack which is configured to connect with an external microphone;
    a first terminal of the coil C and a first terminal of the coil E coupled to the telephone jack;
    a second terminal of the coil C coupled to a second terminal of the coil E;
    first and second terminals of the coil A for coupling to the speaker plug;
    first and second terminals of the coil F for coupling to the microphone plug;
    a first terminal of the coil B coupled to a second terminal of the coil D;
    a second terminal of the coil B and a first terminal of the coil D coupled to the impedance matching circuit;
    a control circuit;
    the control circuit being operative to switchably connect the speaker and the microphone plug contacts to the first and the second hybrid transformers, respectively, in response to detecting a telephone off-hook condition; and
    the control circuit being operative to switchably connect the speaker and the microphone plug contacts to the speaker and the microphone jacks, respectively, in response to detecting a telephone on-hook condition.

2. The interface adapter of claim 1, further comprising:
    a Universal Serial Bus (USB) interface for supplying a bias voltage to the cordless telephone system through the interface adapter.

3. The interface adapter of claim 1, further comprising:
    a speaker plug cable coupled to the speaker plug contact and terminating in the speaker plug; and
    a microphone plug cable coupled to the microphone plug contact and terminating in the microphone plug.

4. The interface adapter of claim 1, further comprising:
    the control circuit comprising:
        a transistor switch;
        a comparator having a first input coupled to the telephone jack, a second input coupled to a reference voltage, and an output coupled to an input of the transistor switch;
        a first relay for switchably coupling the speaker plug contact between the speaker jack and the first hybrid transformer responsive to an output of the transistor switch; and
        a second relay for switchably coupling the microphone plug contact between the microphone jack and the second hybrid transformer responsive to the output of the transistor switch.

5. The interface adapter of claim 1, wherein the hybrid transformer circuit consists of passive components.

6. The interface adapter of claim 1, wherein the speaker jack and the microphone jack are exposed on the housing unit.

7. The interface adapter of claim 1, wherein the impedance matching circuit consists of a resistor.

8. A hybrid transformer circuit for a cordless telephone-to-sound card interface adapter, comprising:
    a first hybrid transformer having a single coil A which is inductively coupled with two coils B and C formed along the same core;
    a second hybrid transformer having a single coil F which is inductively coupled with two coils D and E formed along the same core;
    an impedance matching circuit;
    a telephone jack coupled to first terminals of the coils C and E and being configured to connect to a cordless telephone system with a telephone cord;
    a second terminal of the coil C coupled to a second terminal of the coil E;
    first and second terminals of the coil A for coupling to a speaker plug cable which terminates in a speaker plug configured to connect with a speaker jack of a computer sound card;
    first and second terminals of the coil F for coupling to a microphone plug cable which terminates in a microphone plug configured to connect with a microphone jack of the computer sound card;
    a first terminal of the coil B coupled to a second terminal of the coil D;
    a second terminal of the coil B and a first terminal of the coil D being coupled to the impedance matching circuit;
    a speaker jack being configured to connect with an external speaker;
    a microphone jack being configured to connect with an external microphone;
    a control circuit being operative to switchably connect the speaker and the microphone plug cables to the coils A and F, respectively, in response to detecting a telephone off-hook condition; and
    the control circuit being operative to switchably connect the speaker and the microphone plug cables to the speaker and the microphone jacks, respectively, in response to detecting a telephone on-hook condition.

9. The hybrid transformer circuit of claim 8, further comprising:
   wherein the speaker plug comprises a ⅛ inch miniplug; and
   wherein the microphone plug comprises a ⅛ inch miniplug.

10. The hybrid transformer circuit of claim 8, further comprising:
    a Universal Serial Bus (USB) interface coupled to the hybrid transformer circuit for supplying a bias voltage to the cordless telephone system.

11. The hybrid transformer circuit of claim 8, further comprising:
    wherein the hybrid transformer circuit is carried in a housing unit;
    wherein the telephone jack is carried along a side edge of the housing unit; and
    wherein the speaker jack and the microphone jack are exposed on the housing unit.

12. The hybrid transformer circuit of claim 8, further comprising:
    the control circuit comprising:
        a transistor switch;
        a comparator having a first input coupled to the telephone jack, a second input coupled to a reference voltage, and an output coupled to an input of the transistor switch;
        a first relay for switchably coupling the speaker plug between the speaker jack and the coil A responsive to an output of the transistor switch; and
        a second relay for switchably coupling the microphone plug between the microphone jack and the coil F responsive to the output of the transistor switch.

13. The hybrid transformer circuit of claim 8, wherein the hybrid transformer circuit consists of passive components and the impedance circuit comprises a resistor.

* * * * *